United States Patent
Chung

[11] Patent Number: 5,561,904
[45] Date of Patent: Oct. 8, 1996

[54] ROSE STEM STRIPPER

[76] Inventor: DooBong Chung, 16705 Sioux La., Gaithersburg, Md. 20878

[21] Appl. No.: 489,885

[22] Filed: Jun. 13, 1995

[51] Int. Cl.[6] ................................................. B26B 13/00
[52] U.S. Cl. ................................... 30/234; 30/253; D8/5
[58] Field of Search ...................... 30/234, 253; 47/1.01, 47/58 C; 254/28; D8/4, 5

[56] References Cited

U.S. PATENT DOCUMENTS

| | | | |
|---|---|---|---|
| D. 255,089 | 5/1980 | Walker . | |
| 314,116 | 3/1885 | Flanagan | 254/28 |
| 342,480 | 5/1886 | Thayer | 254/28 |
| 1,459,598 | 6/1923 | Minami . | |
| 2,167,337 | 7/1939 | Meester | 30/173 |
| 2,549,260 | 4/1951 | Sudbury | 254/28 |
| 2,646,621 | 7/1953 | Catanese | 30/340 |
| 2,681,504 | 6/1954 | Fox | 30/234 |
| 3,160,953 | 12/1964 | Darley | 30/279.2 |
| 3,974,999 | 8/1976 | Bertolet | 254/28 |
| 4,455,784 | 6/1984 | Gallo | 30/304 X |
| 4,805,307 | 2/1989 | Lucas, Jr, et al. | 30/294 |
| 5,044,115 | 9/1991 | Richardson | 47/1.01 |
| 5,062,238 | 11/1991 | Smith et al. | 30/279.2 |
| 5,438,759 | 8/1995 | Dieringer | 30/234 |

*Primary Examiner*—Hwei-Siu Payer

[57] ABSTRACT

A rose stem stripper according to the present invention is accomplished by two metal arms including a base, a handle with looped gripping projections and a pair of jaws laterally offset from the handle. The metal arms are pivotally attached to each other at their bases. A rose containing a stem is inserted between the pair of jaws where each jaw has a V-shaped opening with a sharpened edge in order to overlap and form a generally diamond-shaped opening allowing only the rose stem to pass and thereby remove thorns and foliage. The handle of the rose stem stripper being offset from the jaws is gripped via the looped gripping projections and squeezed so that the sharpened edges of the V-shaped openings in the jaws move toward each other and encompass the rose stem. The rose stem stripper then traverses the rose stem, with the handle and hand implementing the rose stem stripper laterally offset from the rose stem, to accomplish stripping without obstructing the rose stem and by utilizing on-axis force components relative to the rose stem.

20 Claims, 4 Drawing Sheets

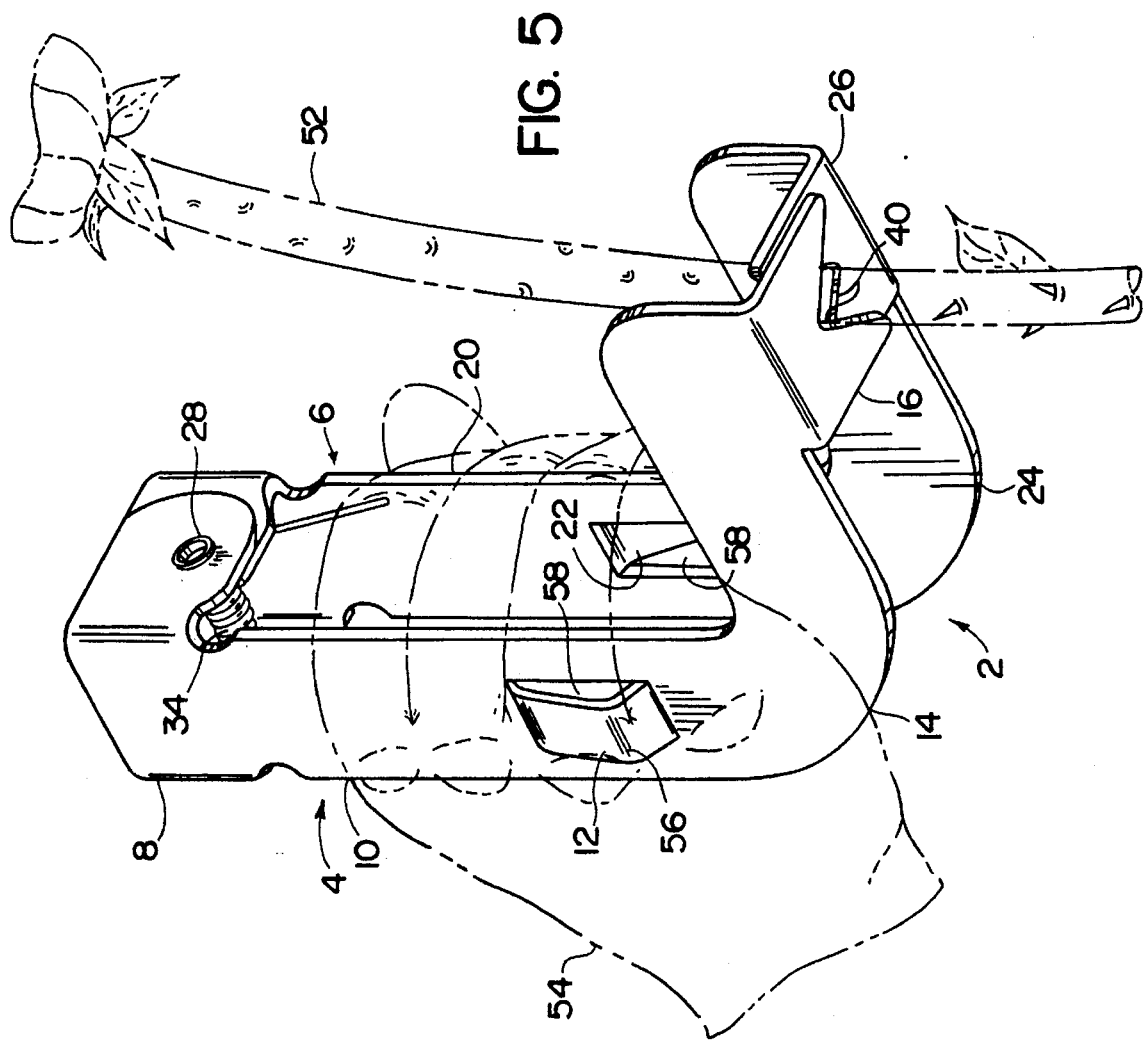

ROSE STEM STRIPPER

BACKGROUND OF THE INVENTION

1. Technical Field

The present invention pertains to improvements in methods and apparatus for removing thorns and foliage from rose stems.

2. Discussion of Prior Art

Several prior art rose strippers are currently for sale on the market including the Clauss No. 350 stem stripper. This stem stripper is similar to the prior art stem stripper disclosed by Walker (U.S. Design Pat. No. 255,089). The Clauss stem stripper includes two substantially rectangular metal arm members of a relatively constant width and thickness throughout their lengths, each having a jaw, a handle and a base. The base is disposed at a proximal end of each of the metal arms and has two parallel projections extending outward from and substantially perpendicular to the sides of the base in a direction towards the base of the other arm, each parallel projection including a substantially circular opening. The parallel projections from the base portion of one of the arms are spaced by a distance slightly greater than the spacing between the projections of the other arm so that the latter projections slidably fit within the former projections, with the circular openings aligned, thereby allowing insertion of a rivet to pivotably attach the base portions at the proximal ends of the metal arms. A helical torsional spring is coiled about the rivet and has opposite ends resiliently urged against respective metal arms of the stripper to resiliently pivotably bias the arms apart to an open position.

The handles of the stem stripper arms are held in a hand of a user. One arm includes a tab extending outward from and substantially perpendicular to prevent the user's fingers from slipping lengthwise along the handle and thereby aid the user in gripping the stem stripper. The handles are disposed between the base and jaw of each arm.

A jaw is disposed at the distal end of each arm and is bent substantially perpendicular to the longitudinal axis of its arm in a direction toward the other arm such that the bent portions form mating jaws facing one another. One of the stripper arms is slightly shorter than the other so that, as the jaws are brought together in opposition to the resilient bias of the spring, one jaw passes or slides along the other in overlapping fashion. Each jaw includes a dull or rounded V-shaped edge opening toward the other jaw such that the overlapping jaws define a generally diamond-shaped opening therebetween allowing the stem of a rose to pass between the jaws but not the thorns or foliage.

Operation of the prior art stem stripper includes placing a rose stem, typically much longer than the arms, between the closed jaws and applying a gentle force to the handle portions of the arms to permit the V-shaped edges of the jaws to engage the stem. Since the rose stem is typically longer than the metal members, the rivet and spring positioned between the metal members tend to obstruct the rose stem if the stem were oriented perpendicular to the planes of the jaws. A force with an off-axis component relative to a longitudinal axis of the rose stem must therefore be applied to overcome the obstruction as the stem is moved through the opening between the jaws to strip thorns and foliage from the stem.

The above-described stem stripper suffers from some practical disadvantages. In particular, the off-axis force component necessitated by the location of the spring and rivet, makes it difficult to pull the stem through the jaws and also tends to bend or break the stem. Further, any off-axis force components, when the stem is pulled tend to bend the stem about the (moving) fulcrum or pivot point created by the jaw edges. The dull or rounded edges of the prior art stem stripper cause unclean removal of thorns and foliage from a stem typically leaving stubble. The gripping aid or tab resides on only one of the metal arms thereby causing unbalanced leverage as only a single finger is utilized to prevent lengthwise slippage. Further, the gripping aid or tab makes utilizing the stripper uncomfortable and may cause injury to the finger pressing against the gripping aid.

OBJECTS AND SUMMARY OF THE INVENTION

Accordingly, it is an object of the present invention to provide a stem stripper having jaws laterally offset relative to a handle in order to avert obstruction of the stem by the rivet and spring. Further, the laterally offset jaws enable application of on-axis components of forces relative to the stem in order to prevent bending or breakage of the stem.

It is another object of the present invention to provide a stem stripper with jaws including sharp edges to cleanly remove thorns and foliage from a stem.

Yet another object of the present invention is to provide projecting loops on each arm of a stem stripper to more evenly distribute leverage and enhance the gripping capabilities.

According to the present invention, two metal arms each include a base disposed at a proximal end, a handle disposed adjacent the base, and a jaw disposed at the distal end. The metal arms are pivotally attached to each other at their bases by a rivet. A helical torsional spring is coiled around the rivet having opposite ends resiliently urged against respective metal arms to pivotally bias the metal arms apart to an open position. Each handle of the metal arms includes a looped grip projection, typically in the form of an arc, extending outward from the handle to enhance gripping. The metal arms are each curved at a distal end of the handle substantially perpendicular to the longitudinal axis of the respective metal arms to laterally offset the jaw from the handle in order for the jaw to apply forces typically containing only on-axis components relative to the stem.

The jaw is laterally disposed at the distal end of each of the metal arms following the curved handle and is bent substantially perpendicular to the longitudinal axis of its metal arm handle in a direction toward the other metal arm such that the bent portions form mating jaws facing one another. Each jaw includes a sharp V-shaped edge opening towards the other jaw to remove thorns and foliage from stems. When the jaws are moved toward each other the V-shaped edge openings of the jaws overlap and define a generally diamond-shaped opening therebetween allowing only the stem of a rose to pass between the jaws. As the jaws are laterally offset from the handle, the rivet and spring do not obstruct the stem and a force applied to either pull the stem through the opening or pull the stem stripper along the stem contains typically only on-axis components in relation to the stem. Thorns and foliage present on the stem are removed as only the stem can pass through the opening between the jaws.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

BRIEF DESCRIPTION OF THE DRAWINGS

FIG. 5 is a view in perspective of a rose stem stripper illustrating an alternative mode of operation according to the present invention.

DESCRIPTION OF THE PREFERRED EMBODIMENTS

Figure 1:
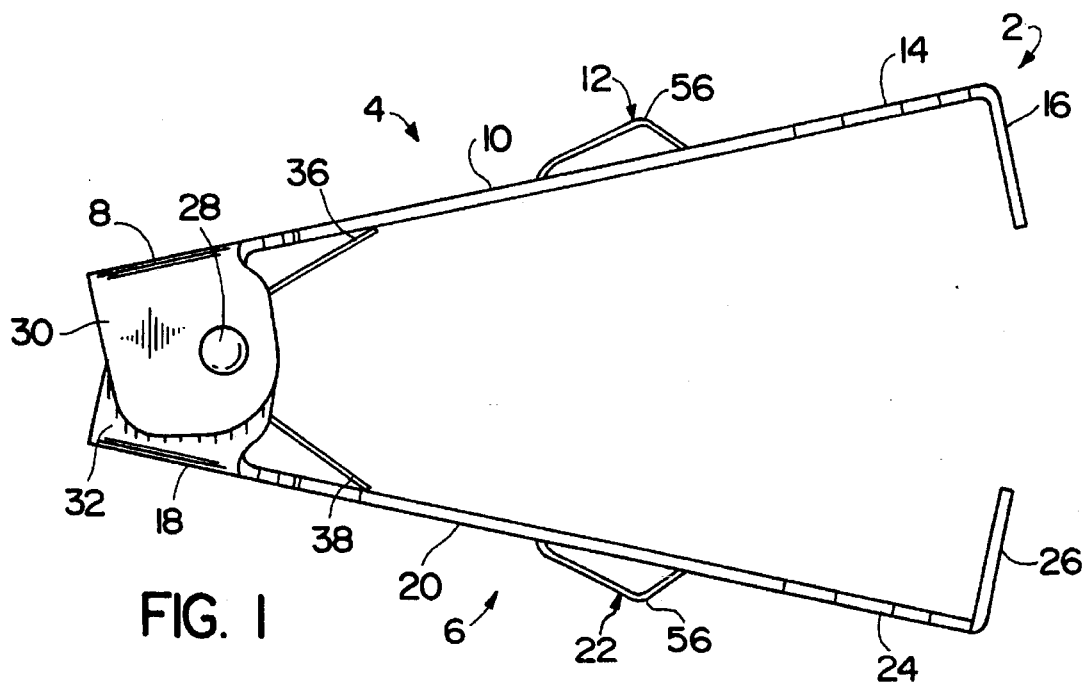
FIG. 1 is a rear view in perspective of a rose stem stripper of the present invention.
Figure 2:
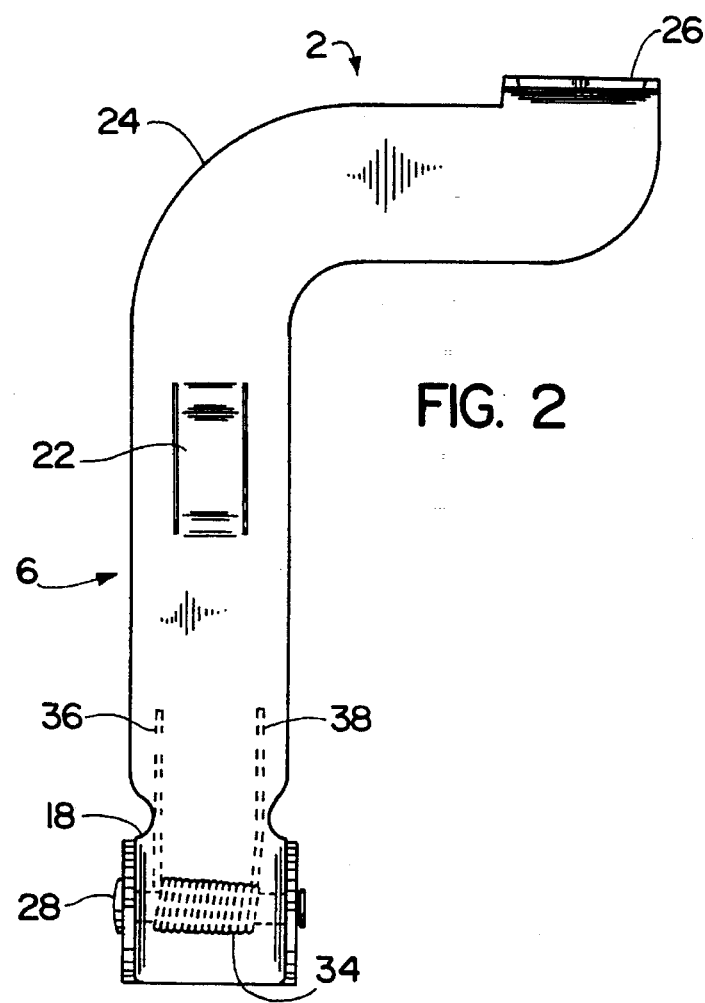
FIG. 2 is a side view in perspective of a rose stem stripper of the present invention.

FIGS. 1 and 2 illustrate a rear and side view of the present invention. Specifically, a stem stripper 2 includes metal arms 4, 6. Metal arm 4 includes base 8, handle 10 with looped grip projection 12, curve 14 and jaw 16. Similarly, metal arm 6 includes base 18, handle 20 with looped grip projection 22, curve 24 and jaw 26. Metal arms 4 and 6 are attached to each other at bases 8, 18 by rivet 28. Specifically, each base 8, 18 has respective extensions 30, 32 projected outward from and substantially perpendicular to a respective side of bases 8, 18 in a direction towards the base of the other metal arm. A second projection (not shown) of each base 8, 18 extends outward from and substantially perpendicular to a respective opposite side of bases 8, 18, parallel to extensions 30, 32 in a direction towards the base of the other metal arm. Each extension includes a substantially circular opening (not shown) within which rivet 28 is inserted. The parallel projections of base 8 are separated by a distance slightly greater than the spacing of the parallel projections of base 18 so that the latter projections slidably fit within the former projections with the circular openings aligned thereby allowing insertion of rivet 28 to pivotally attach bases 8, 18 of metal arms 4, 6. Helical torsional spring 34 is coiled around rivet 28 with opposite ends 36, 38 resiliently urged against respective metal arms 4, 6 to resiliently pivotally bias metal arms 4, 6 apart to an open position.

Rose stem stripper 2 is gripped around handles 10, 20 where looped grip projections 12, 22 enhance gripping by providing a sturdy support structure to enable a hand of a user to gain leverage and avoid lengthwise slipping along handles 10, 20 when applying force to move metal arms 4, 6 toward each other and traverse a stem.

Looped grip projections 12, 22 are disposed in handles 10, 20 of metal arms 4, 6 and project outward parallel to a respective longitudinal axis of handles 10, 20. The looped grip projections 12, 22 form an arc such that both ends of looped grip projections 12, 22 are connected to handles 10, 20, and cover a substantially rectangular opening 58 (FIGS. 4 and 5) in handles 10, 20. The looped grip projections are bent in two places skewing the arc and forming a ledge 56 at a distal portion of the arc.

Curves 14, 24 are disposed at the distal ends of handles 10, 20 and are each similarly curved substantially perpendicular to the longitudinal axis of metal arms 4, 6 respectively. Curves 14, 24 laterally offset jaws 16, 26 from handles 10, 20, in order to remove obstructions of a stem by the stem stripper 2.

Jaws 16, 26 are laterally disposed at distal ends of metal arms 4, 6 following curves 14, 24. Jaws 16, 26 are bent substantially perpendicular to the longitudinal axis of handles 10, 20 of metal arms 4, 6 respectively in a direction toward the other metal arm such that the bent portions form mating jaws facing one another. Jaws 16, 26 each contain a sharp V-shaped edge opening toward the other jaw to remove thorns and foliage from stems. Metal arm 6 is slightly shorter than metal arm 4 so that when jaws 16, 26 are moved toward each other in opposition to the resilient bias of the spring, the V-shaped edge openings overlap having jaw 16 on top of jaw 26 to form a generally diamond-shaped opening through which a stem may pass but thorns and foliage are blocked and thereby removed. Further, since jaws 16, 26 are disposed laterally off-axis relative to handles 10, 20, the rose stem stripper 2 does not obstruct the stem thereby eliminating the application of off-axis force components causing bending and breakage of the stem.

Figure 3A:
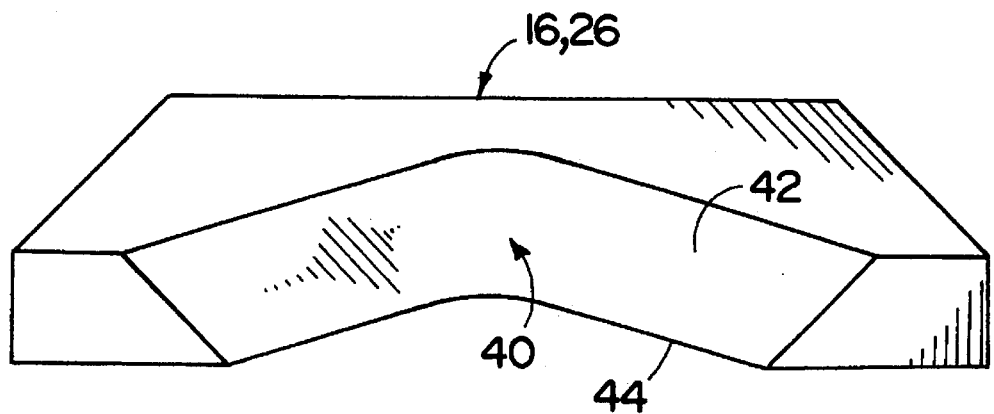
FIG. 3A is a more detailed view of the jaw of the rose stem stripper including a single angled edge according to the present invention.

Jaws 16, 26 may include differing configurations of V-shaped edge openings. Referring to FIG. 3A, jaws 16, 26 include a V-shaped edge opening 40 where an exterior surface 42 of V-shaped edge opening 40 is sloped at an angle to enable stripping edge 44 to protrude and contact the stem. Stripping edge 44 is a sharpened edge for removing thorns and foliage.

Figure 3B:
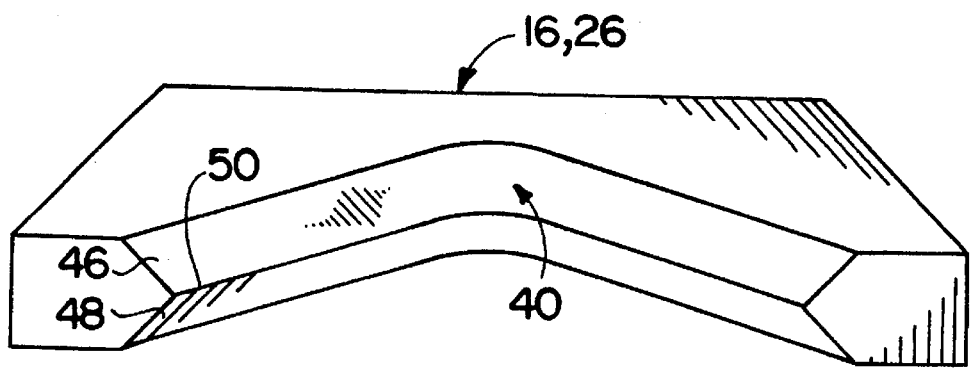
FIG. 3B is a more detailed view of the jaw of the rose stem stripper including converging edges according to the present invention.

Alternatively, FIG. 3B illustrates a second V-shaped edge opening configuration for jaws 16, 26. Specifically, V-shaped edge opening 40 has two exterior surfaces 46, 48 each sloped at opposing angles in order to protrude from V-shaped edge opening 40 and intersect to form stripping edge 50. Stripping edge 50 is a sharpened edge for removing thorns and foliage.

Figure 4:
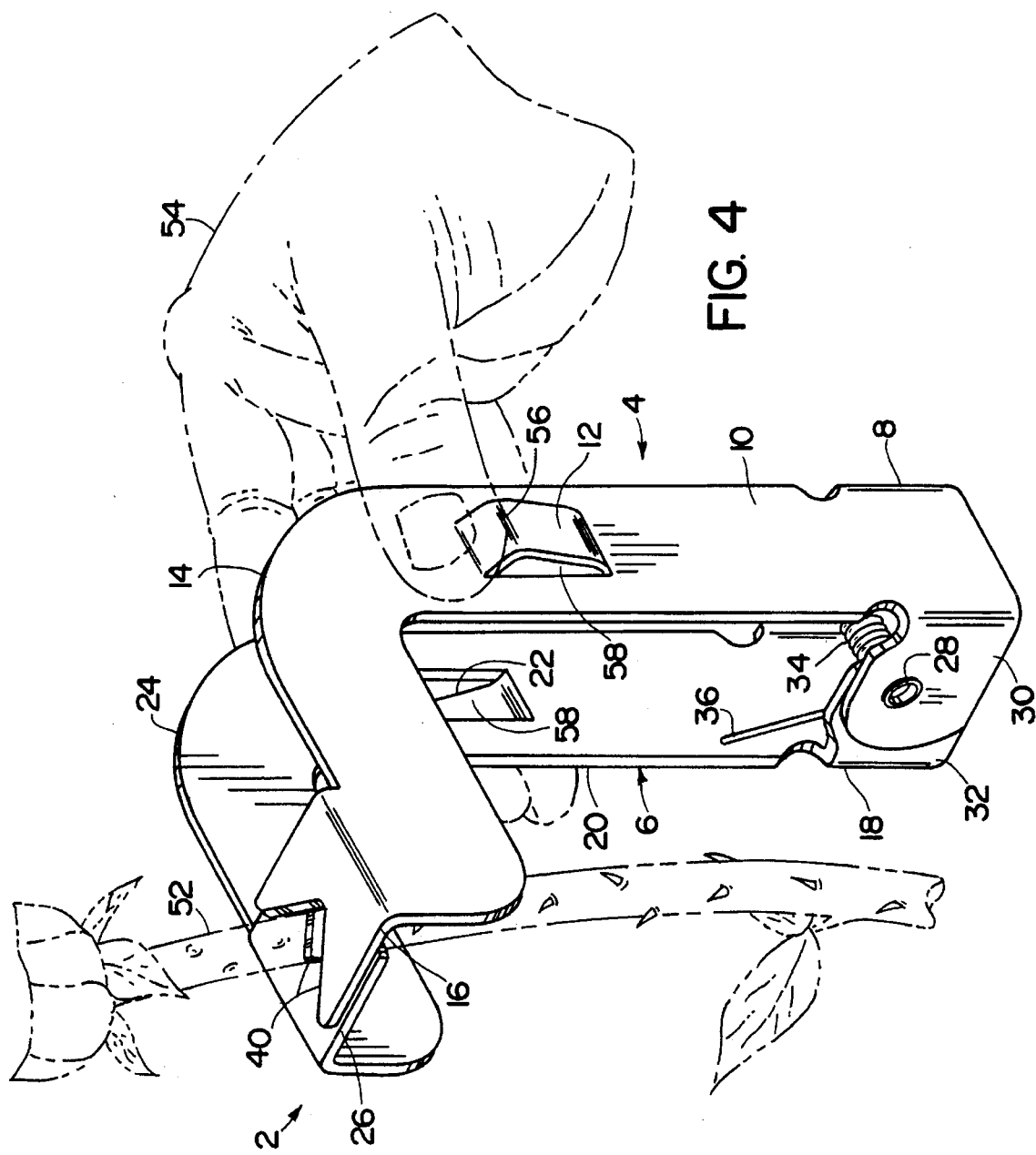
FIG. 4 is a view in perspective of a rose stem stripper illustrating a mode of operation according to the present invention.

Operation of the present invention is now described. Referring to FIG. 4, hand 54 grips stem stripper 2 around handles 10, 20 of metal arms 4, 6. The thumb and forefingers of hand 54 are positioned on looped grip projections 12, 22. A stem 52 is placed between jaws 16, 26 and hand 54 applies force to handles 10, 20 in order to overcome the force applied by helical torsional spring 34 and move jaws 16, 26 toward each other until V-shaped edge openings 40 contact stem 52. Stem 52 is either pulled up along its longitudinal axis, or the stem stripper 2 is pulled down having jaws 16, 26 along the longitudinal axis of stem 52 to traverse the stem and remove any thorns or foliage.

Alternatively, FIG. 5 illustrates a second mode of operation substantially similar as described above. Hand 54 grips stem stripper 2 around handles 10, 20 where rose stem stripper 2 is inverted relative to FIG. 4. Stem 52 is inserted between jaws 16, 26 and hand 54 applies force to handles 10, 20 in order to overcome the force applied by helical torsional spring 34 and move jaws 16, 26 toward each other until V-shaped edge openings 40 contact stem 52. Stem stripper 52 is pulled down having jaws 16, 26 along the longitudinal axis of stem 52 to traverse stem 52 and remove any thorns or foliage.

It will be appreciated that the embodiments described above and illustrated in the drawings represent only few of the many ways of implementing a rose stem stripper.

The present invention may be implemented in plastic or other sturdy material capable of withstanding the forces needed to remove thorns and foliage from a stem.

The edges of the jaws may be any shape allowing passage of the stem and removal of thorns and foliage.

The stem stripper may be utilized in any fashion capable of removing thorns and foliage from any type of stem and is not limited to the specific mode of operation or particular stem described herein.

The spring mechanism may be implemented by any means applying force to keep the arm members apart.

The arm members may be attached to each other by rivet, rod, nut and bolt or any other means capable of securing the arm members together.

From the foregoing description it will be appreciated that the invention makes available a novel method and apparatus for a rose stem stripper whereby the jaws of the rose stem stripper are aligned with the axis of the stem to apply force on-axis and avoid bending and breakage of the stem.

Having described preferred embodiments of a new and improved method and apparatus for a rose stem stripper, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. An apparatus for stripping thorns and leaves from a stem of a rose comprising:
   a pair of stripping members pivotably joined to pivot toward and away from each other, each said stripping member including:
      a base disposed at a proximal end of said stripping member;
      a handle disposed adjacent said base and including a pivotable proximal end for pivoting said stripping member and a bend directed away from a longitudinal axis of said stripping member disposed toward a distal end of said stripping member; and
      a jaw disposed distally of said bend and laterally offset from said base by said bend at a distal end of said stripping member;
   wherein said pair of stripping members are connected at said bases such that said jaws face each other;
   connection means for connecting said bases of said stripping members to each other;
   resiliency means for maintaining said stripping members apart, said resiliency means disposed around said connection means; and
   grip means disposed within said handle for increasing leverage in applying force to said handle in order to strip said stem.

2. The apparatus of claim 1 wherein said base includes a pair of outward projections each having an opening, said outward projections of one of said bases being positioned between said outward projections of the other said base whereby said openings are aligned.

3. The apparatus of claim 2 wherein said connection means is inserted through said aligned openings to connect said base portions.

4. The apparatus of claim 1 wherein said grip means comprises a looped member.

5. The apparatus of claim 4 wherein said looped member includes a ledge formed by a bend in said looped member.

6. The apparatus of claim 1 wherein each said jaw comprises a V-shaped opening so that said V-shaped openings of said jaws overlap to form a substantially diamond-shaped opening in response to said jaws moving together.

7. The apparatus of claim 1 wherein said connection means comprises a rivet.

8. The apparatus of claim 1 wherein said resiliency means comprises a spring.

9. A method for stripping a stem of a rose which comprises utilizing the apparatus of claim 1.

10. An apparatus for stripping a stem of a rose comprising:
    a pair of stripping members, each said stripping member including:
       a base disposed at a proximal end of said stripping member;
       a handle disposed adjacent said base; and
       a jaw disposed at a distal end of said stripping member and laterally offset from said handle including a sharpened edge protruding from a sloped exterior surface thereof;
    wherein said pair of stripping members are connected at said bases such that said jaws face each other;
    connection means for connecting said bases of said stripping members to each other;
    resiliency means for maintaining said stripping members apart, said resiliency means disposed around said connection means; and
    grip means disposed within said handle for increasing leverage in applying force to said handle in order to strip said stem.

11. An apparatus for stripping a stem of a rose comprising:
    a pair of stripping members, each said stripping member including:
       a base disposed at a proximal end of said stripping member;
       a handle disposed adjacent said base; and
       a jaw disposed at a distal end of said stripping member and laterally offset from said handle, each said jaw including two exterior surfaces positioned at an angle and a sharpened edge, wherein said two exterior surfaces intersect to form said sharpened edge;
    wherein said pair of stripping members are connected at said bases such that said jaws face each other;
    connection means for connecting said bases of said stripping members to each other;
    resiliency means for maintaining said stripping members apart, said resiliency means disposed around said connection means; and
    grip means disposed within said handle for increasing leverage in applying force to said handle in order to strip said stem.

12. An apparatus for stripping thorns and leaves from a rose stem by pulling the rose stem through closed jaws of the apparatus, said apparatus including: first and second arms with proximal and distal ends with each arm having a bend directed away from a longitudinal axis of, and disposed toward the distal end of, the respective arm; said proximal ends including bases being pivotably engaged to permit the arms to pivot between open and closed positions; and first and second jaws secured to said first and second arms, respectively, in facing relation to engage a rose stem between said jaws when said arms are in said closed position; said apparatus being characterized by said jaws being disposed distally of said bends and laterally offset from said bases by said bends to permit an engaged rose stem to be pulled through said jaws without interference from said proximal ends of said arms.

13. The apparatus of claim 12 wherein said first and second jaws are secured to the distal ends of said first and second arms, respectively, wherein each of said arms includes an elongated handle portion extending from the proximal end of said each arm, and a jaw support portion extending transversely from the handle portion and having a respective one of said jaws located at an end of the jaw support portion remote from the handle portion.

14. The apparatus of claim 12 wherein said first and second jaws are secured to the distal ends of said first and second arms, respectively, and said apparatus further comprises bias means for resiliently biasing said arms toward said open position.

15. The apparatus of claim 12 wherein said first and second arms each include a grip disposed toward said distal end, wherein said grip includes a looped member being bent proximate its proximal and distal ends forming a skewed arc with a ledge disposed toward the distal end of said arc.

16. The apparatus of claim 12 wherein each said jaw includes a V-shaped opening having a sharpened beveled or angled edge such that said V-shaped openings overlap to form a diamond-shaped opening and engage said rose stem in response to said arms being in said closed position.

17. An apparatus for stripping thorns and leaves from a rose stem comprising:

first and second arms with each arm having a base at a proximal end and a bend directed away from a longitudinal axis of, and disposed toward a distal end of, the respective arm;

first and second jaws secured to said first and second arms, respectively;

wherein said first and second arms are movably engaged with one another at respective bases to permit selective movement toward and away from one another between open and closed arm positions, wherein said jaws are positioned to engage a rose stem therebetween in the closed arm position and thereby permit the rose stem to be pulled through said jaws and have its thorns and leaves stripped from the stem by the jaws; and wherein said jaws are disposed distally of said bends and laterally offset from said bases by said bends to permit the rose stem to be pulled freely through said jaws without interference by any portions of said arms.

18. The apparatus of claim 17 wherein said first and second arms each include a grip, wherein said grip includes a looped member being bent proximate its proximal and distal ends forming a skewed arc with a ledge disposed toward a distal end of said arc.

19. The apparatus of claim 17 wherein each said jaw includes a V-shaped opening having a sharpened beveled or angled edge such that said V-shaped openings overlap to form a diamond-shaped opening in order to engage said rose stem in said closed arm position.

20. The apparatus of claim 17 wherein each of said arms includes an elongated handle portion extending from a proximal end of said each arm, and a jaw support portion extending transversely from the handle portion and having a respective one of said jaws located at an end of the jaw support remote from the handle portion; and said apparatus further comprises spring bias means for resiliently biasing said arms toward said open arm position.

* * * * *